United States Patent [19]

Pennypacker et al.

[11] Patent Number: 5,777,558
[45] Date of Patent: Jul. 7, 1998

[54] METHOD FOR DETECTING FRAUDULENT USE OF A COMMUNICATION SYSTEM

[75] Inventors: Frank Pennypacker, Arlington Heights; Richard J. Corrigan, Schaumburg; Timothy M. Burke, Algonquin, all of Ill.

[73] Assignee: Motorola, Inc., Schaumburg, Ill.

[21] Appl. No.: 609,754

[22] Filed: Feb. 29, 1996

[51] Int. Cl.[6] .................................................. G08B 21/00
[52] U.S. Cl. ............................ 340/635; 379/62; 379/189
[58] Field of Search ................................ 340/635; 379/62, 379/189, 59, 145, 95; 455/33.1; 380/23

[56] References Cited

U.S. PATENT DOCUMENTS

| 5,345,595 | 9/1994 | Johnson et al. | 379/189 |
| 5,351,290 | 9/1994 | Naeini et al. | 379/189 |
| 5,448,760 | 9/1995 | Frederick | 379/62 |
| 5,495,521 | 2/1996 | Rangachar | 379/189 |
| 5,504,810 | 4/1996 | McNair | 379/189 |
| 5,559,874 | 9/1996 | Panosh | 379/189 |

Primary Examiner—Jeffery Hofsass
Assistant Examiner—John Tweel, Jr.
Attorney, Agent, or Firm—J. Ray Wood

[57] ABSTRACT

A method for detecting fraudulent use of a communication system (10) includes the steps of determining a system parameter associated with a subscriber unit (32). The system then compares the system parameter to a previous system parameter for the subscriber unit (32). An alarm is set when the system parameter differs more than a predetermined amount from the previous system parameter.

10 Claims, 2 Drawing Sheets

FIG.1

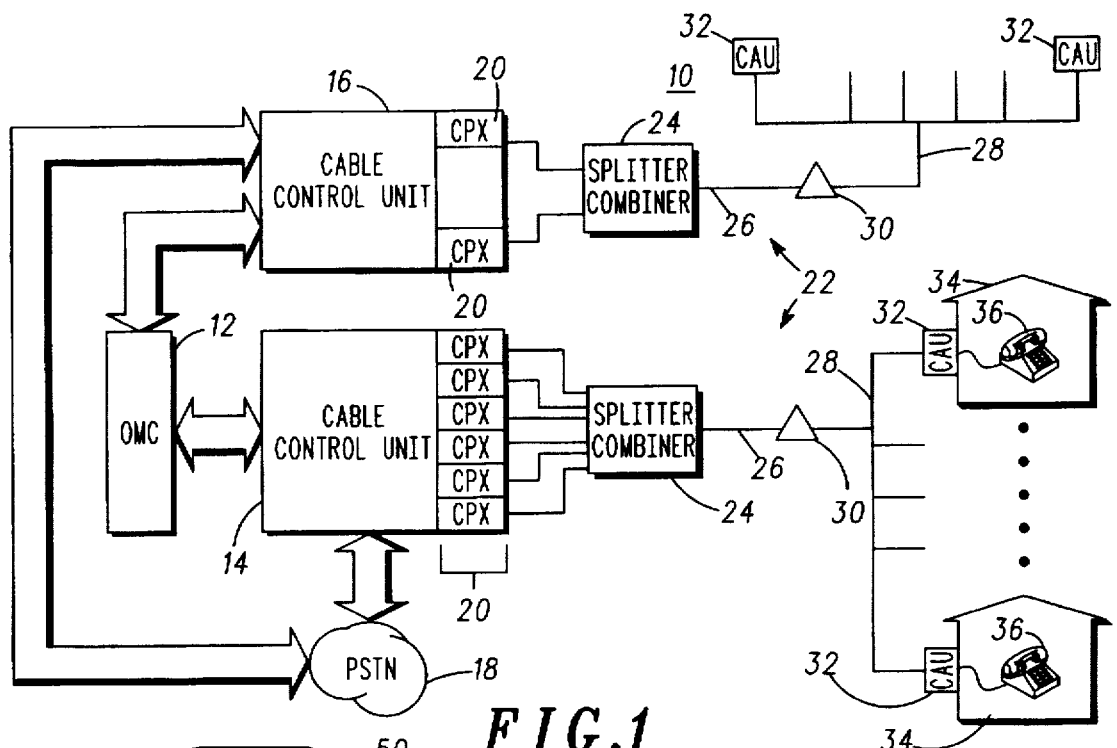
FIG.1
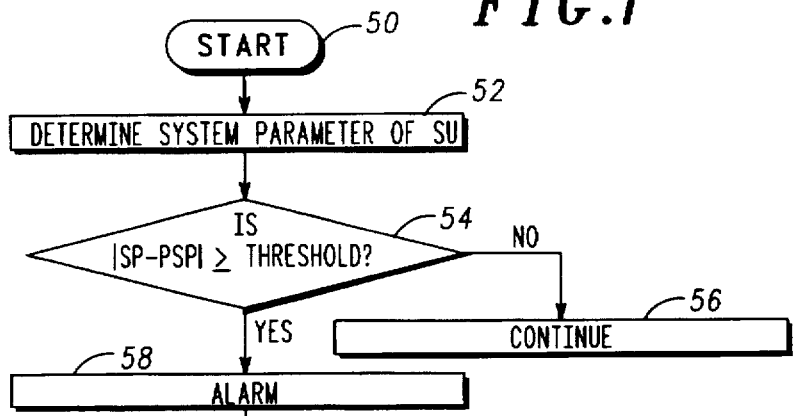
FIG.2
FIG.3

5,777,558

METHOD FOR DETECTING FRAUDULENT USE OF A COMMUNICATION SYSTEM

FIELD OF THE INVENTION

The invention relates generally to the field of communication systems and more particularly to a method for detecting fraudulent use of a communication system.

BACKGROUND

Communication systems have become a tempting target for criminals. They use fraudulent means to obtain access to a communication system and often resell the illegally obtained time to others. Communication products, such as, cellular telephones, internet access providers and calling cards are tempting targets for criminals. A criminal can steal thousands of dollars of telephone service by knowing a legitimate user's calling card number. Similarly, a criminal can illegally access the internet (on-line service) by knowing a legitimate user's password and screen name. Criminals have been able to steal air time on analog cellular phones by capturing the identity number transmitted by a legitimate user. Once the identity number is captured it can be mimicked by the criminal to place a cellular call.

Recognizing these problems the new digital cellular telephone systems are designed to use cryptographic techniques to identify the subscriber units. The digital cellular system units and the subscriber units have secret cryptographic keys, which are used to generate authentication responses. These authentication responses are calculated using the secret keys and other information, such as the time of day or random numbers broadcast to all subscribers. The authentication response never involves sending the secret cryptographic keys over the communication channel. Since both the subscriber unit and the system unit have the same keys, they can both make the same calculation and if the results match, the subscriber unit is accepted as authentic. In spite of these safeguards the keys can be obtained by several methods including: intercepting the keys when they are delivered to the subscriber unit, by fraudulent access to the operating company's system or by extracting the information from the paying subscriber's unit.

Thus there exists a need for additional fraud prevention techniques that cannot be defeated by obtaining a valid password or secret key.

BRIEF DESCRIPTION OF THE DRAWINGS

FIG. 1 is a block diagram of a cable telephony system;

FIG. 2 is a flow chart illustrating the steps taken in a process for detecting the fraudulent use of a communication system;

FIG. 3 is a flow chart illustrating an alternative embodiment of the process of FIG. 2.

DETAILED DESCRIPTION OF THE DRAWINGS

Figure 4:
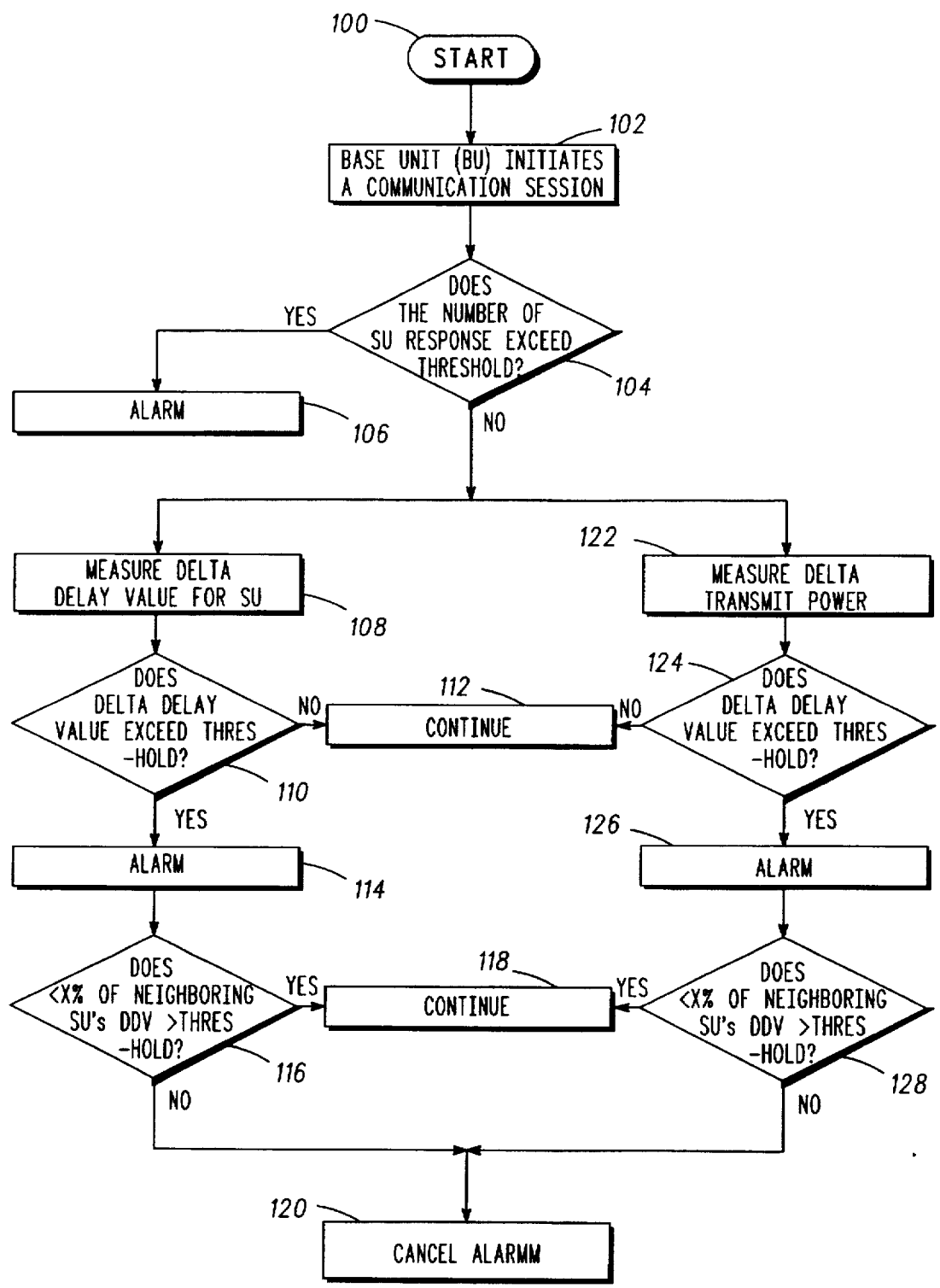
FIG. 4 is a flow chart illustrating an alternative to the steps taken in a process for detecting the fraudulent use of a communication system.

The invention monitors system parameters related to a subscriber unit. When the system parameter changes by more than a predetermined amount, an alarm condition is set. System parameters that can be used as indicators of fraudulent use include: the time delay between a base unit and a subscriber unit, the required transmit power of a subscriber unit, the number of subscriber responses to a base query and the distance between the base unit and the subscriber unit.

A cable telephony communication system is used as an example of a communication system that can exploit the invention. The invention can be used with other communication systems and the claims at the end of the patent are intended to cover all such communication systems.

FIG. 1 is a block diagram of a cable telephony system 10. An operations and management center (OMC) 12 controls and coordinates the overhead functions of the cable telephony system 10. The OMC 12 is coupled to a pair of cable control units (CCU) 14, 16 that act as the interface between the cable telephony system 10 and a public switched telephone network (PSTN) 18. The cable control units (CCU) are analogous to base units in other communication systems. The CCUs 14, 16 contain a number of cable port transceivers (CPX) 20. Each CPX (base unit) 20 is capable of carrying on a communication session on one of the communication channels available on a fiber-coax hybrid cable plant 22. A combiner/splitter 24 combines the transmissions from the plurality of CPXs 20 onto the cable plant 22. The combiner/splitter 24 splits and distributes the signals coming into the CPXs 20. The cable plant 22 is composed of a fiber optic cable 26, a coaxial cable 28 and an optical to electrical converter 30. The coaxial cable 28 fans out and is connect to a plurality of cable access units (CAU) 32. The cable access units (CAUs) are analogous to subscriber units in other communication systems. The CAUs 32 are attached to the outside of a subscriber's premises 34 (only shown on one branch). One of the CAU's functions is to convert the radio frequency digital signals in the coaxial cable 28 to the analog signals used in a Plain Old Telephone Service (POTS) telephone 36.

The cable telephony system 10 is a trunked, time division multiplexed-time division multiple access (TDM/TDMA) communication system. A trunked communication system does not have dedicated communication channels (telephone lines) for every subscriber unit (CAU). For example a trunked system might have one hundred communication channels and one thousand subscriber units. When a subscriber unit wants to place a call it sends a notification message to the system (CCU), that then assigns one of the unused communication channels to the subscriber unit. When the call is over, the communication channel is freed up for other subscribers.

In the cable telephone system 10 a communication channel is defined by a carrier frequency and a time slot. Signals originating from the CCU are transmitted at a particular time slot on a particular frequency (i.e., time division multiplexing). A CAU is assigned a time slot and particularly carrier frequency as a communication channel. Since many CAUs are attempting to access the CCU the system is called a time division multiple access (TDMA) system. For a TDMA system to work all signals from the CAUs must arrive at the CCU within the correct time slot. As a result the CAU has to adjust when it transmits its signal for the time delay between the CCU and CAU. When the CAUs fail to time align their transmitted pulses, their respective pulses will overlap at the CCU garbling their communications. The process of adjusting the time of transmission for a CAU is called a time alignment procedure. The time alignment procedure is performed every time a CAU is involved in a communication session to adjust for any difference since the last communication session. One particularly useful method for time aligning is disclosed in co-pending U.S. patent application, Ser. No. 08/564,606, entitled Method and Apparatus for Synchronizing Timing of Components of a Telecommunication System, filed on Nov. 29, 1995, which is incorporated herein by this reference. Some of the reasons that the time delay between the CCU and CAU changes include large temperature shifts that affect the transmission impedance of the coaxial cable or age induced changes in the transmission impedance of the coaxial cable. The time alignment (or delta delay value) of a CAU is considered to be a "system parameter" that is adjusted frequently in the course of utilizing the communication system.

Another system parameter that is adjusted every communication session is the CAU transmit power. During every communication session the CCU monitors the CAU transmit power and when the received signal is too small the CCU sends a message (delta transmit power) to the CAU to increase its transmit power. When the received signal from the CAU is too high, the CCU sends a message (delta transmit power) to the CAU to decrease its power. One particularly useful method for adjusting power is disclosed in co-pending U.S. patent application, Ser. No. 08/548,972, entitled Method and Apparatus for Adaptive RF Power Control of Cable Access Units, filed on Oct. 27, 1995, which is incorporated herein by this reference.

Because these system parameters should not vary greatly over a short time, it is possible to detect potentially fraudulent use of the communication by monitoring these system parameters.

FIG. 2 is an embodiment of the steps taken by a process to detect fraudulent use of a communication system. The process starts, at step 50, by determining a system parameter of one of the subscriber units (SU), at step 52. Next, the system parameter (SP) is compared to a previous system parameter (PSP) that was stored in the CCU along with other information on the CAU, at step 54. When the difference between the system parameter and the previous system parameter is not greater than a predetermined amount (threshold) at step 54, then the communication session continues by processing the call at step 56. When the difference between the system parameter and the previous system parameter is greater than a predetermined amount, an alarm condition is set at step 58. The alarm alerts the CCU that the subscriber maybe a fraud. The process either ends at step 60 or in another embodiment continues in FIG. 3

When the process continues in FIG. 3 a second check is performed to determine if this is a false alarm. The process continues by determining the system parameter for neighboring subscriber units, step 62. This can be accomplished by either measuring the system parameter for all the neighboring units or by looking up the most recent measurement of the system parameter. In the case of the cable telephony system 10 the neighboring subscriber units are all the CAUs 32 communicating with the same CCU 14. At step 64 it is determined if more than a predetermined number (X%) of the plurality of neighboring subscriber units have a system parameter that differs more than the predetermined amount from the previous system parameter. When fewer than the predetermined number of neighboring subscriber units have system parameters that differ more than the predetermined amount from the previous system parameter, the alarm condition remains at step 66. When more than the predetermined number of neighboring subscriber units have system parameters that differ more than the predetermined amount from the previous system parameter, the alarm condition is canceled at step 68. The idea behind the process of FIG. 3 is that if a large number of subscriber units have large changes in one of their system parameters, then it is likely that the changes are due to some change in the system. Some of the system parameters that can be used to indicate fraudulent use are: the time delay between the subscriber unit and the base unit; the required transmit power level of the subscriber unit; the number of responses to a base query of a subscriber unit and the distance between the base unit and the subscriber unit.

FIG. 4 is an alternative embodiment of the steps used to detect fraudulent use of a communication system. The process starts, step 100, with the base unit (BU) initiating a communication session with a subscriber unit (SU) by transmitting an alert (base query), at step 102. The number of responses is counted and it is determined if they exceed a predetermined number (threshold), at step 104. When the number of responses exceeds a predetermined number, an alarm condition exists at step 106. Usually a single response is expected since every subscriber unit has a unique identifier. If two subscriber units have the same identifier, it would be impossible to place a call to a unique subscriber. Criminals that want to steal time from a communication system mimic the identifier of a legitimate subscriber unit. As a result, when two responses are received it is a sign that there is a fraudulent subscriber unit.

When the number of responses does not exceed a predetermined number, the process continues along two parallel paths. In one path a delta delay value (DDV) is measured for the subscriber unit, at step 108. The delta delay value is amount of time that the subscriber unit needs to change its timing delay. The delta delay value is measured in the cable communication system of FIG. 1 during the time alignment procedure. At step 110, it is determined if the delta delay value exceeds a predetermined delta delay value. When the delta delay value does not exceed the predetermined delta delay value (threshold), the communication continues normally at step 112. When the delta delay value exceeds a predetermined delta delay value, an alarm is set at step 114. At step 116 it is determined if more than a predetermined number of neighboring subscriber units also have delta delay values (DDV) that exceed the threshold. When less than a predetermined number of neighboring subscriber units have delta delay values (DDV) that exceed the threshold at step 116, the alarm condition continues at step 118. When more than a predetermined number of neighboring subscriber units have delta delay values (DDV) that exceed the threshold at step 116, the alarm condition is canceled at step 120.

In the second path from step 104, the delta transmit power for the subscriber unit is measured at step 122. The delta transmit power is the amount the subscriber unit needs to increase or decrease its transmit power. Next it is determined if the delta transmit power exceeds a predetermined delta transmit power (threshold), at step 124. When the delta transmit power does not exceed the threshold, the communication session continues normally at step 112. When the delta transmit power does exceed the threshold, the alarm is set at step 126. At step 128, it is determined if more than a predetermined number of the neighboring subscriber units (SUs) have a delta transmit power that exceeds the threshold. When less than a predetermined number of the neighboring subscriber units (SUs) have a delta transmit power that exceeds the threshold, the alarm continues at step 118. When more than a predetermined number of the neighboring subscriber units (SUs) have a delta transmit power that exceeds the threshold, the alarm condition is canceled at step 120. At any point (106, 114, 126) a fraudulent condition exists the system can measure the time delay to the subscriber unit and use this information to determine the distance to the suspected fraudulent unit. This can help locate the position of the suspected fraudulent unit.

Thus there has been described a method of detecting and deterring fraudulent use of a communication system that does not rely on passwords or secret keys. The system monitors system parameters that should vary slowly. When a big change occurs in one of these system parameters it is indicative of fraudulent use. Once a fraud alarm is set the system can measure the distance to the suspected fraudulent subscriber unit by determining the time delay between the subscriber unit and the base unit.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method for detecting fraudulent use of a communication system, comprising the steps of:
   (a) determining a system parameter associated with a subscriber unit;
   (b) comparing the system parameter to a previous system parameter for the subscriber unit;
   (c) when the system parameter differs more than a predetermined amount from the previous system parameter, setting an alarm condition;
   (d) determining the system parameter for a plurality of neighboring subscriber units; and
   (e) when the system parameter differs more than the predetermined amount from the previous system parameter for more than a predetermined number of the plurality of neighboring subscriber units, canceling the alarm condition.

2. The method of claim 1, wherein step (a) includes determining a time delay between a base and the subscriber unit.

3. The method of claim 1, wherein step (a) includes determining a required transmit power level for the subscriber unit.

4. The method of claim 1, wherein step (a) includes determining a number of responses to a base query of the subscriber unit.

5. The method of claim 1, wherein step (a) includes determining a distance between a base unit and the subscriber unit.

6. The method of claim 1, further including the step of:
   (d) measuring a distance to the subscriber unit.

7. A method for detecting fraudulent use of a communication system, comprising the steps of:
   (a) initiating a communication session by a base unit to a subscriber unit;
   (b) counting a number of times the subscriber unit responds to an alert transmitted by the base unit;
   (c) when the number of times exceeds a predetermined number, determining an alarm condition exists;
   (d) determining a delta delay value between the base unit and the subscriber unit;
   (e) when the delta delay value exceeds a predetermined delta delay value, determining the alarm condition exists;
   (f) determining the delta delay value for a plurality of neighboring subscriber units; and
   (g) when the delta delay value for more than a predetermined number of the plurality of neighboring subscriber units exceeds the predetermined delta delay value, canceling the alarm condition.

8. A method for detecting fraudulent use of a communication system, comprising the steps of:
   (a) measuring a delta time delay between a base unit and a subscriber unit;
   (b) measuring a delta transmit power for the subscriber unit;
   (c) when the delta time delay exceeds a maximum delta time delay, setting an alarm;
   (d) when the delta transmit power exceeds a maximum delta transmit power, setting the alarm;
   (e) when the alarm is set, measuring the delta time delay for a plurality of neighboring subscriber units; and
   (f) when the delta time delay for a predetermined number of the plurality of neighboring subscriber units exceeds the maximum delta time delay, canceling the alarm.

9. The method of claim 8, further including the steps of:
   (e) when the alarm is set, measuring the delta transmit power for a plurality of neighboring subscriber units; and
   (f) when the delta transmit power for a predetermined number of the plurality of neighboring subscriber units exceeds the maximum delta transmit power, canceling the alarm.

10. A method for detecting fraudulent use of a communication system, comprising the steps of:
    (a) initiating a communication session by a base unit to a subscriber unit;
    (b) counting a number of times the subscriber unit responds to an alert transmitted by the base unit;
    (c) when the number of times exceeds a predetermined number, determining an alarm condition exists
    (d) determining a delta transmit power for the subscriber unit; and
    (e) when the delta transmit power exceeds a predetermined delta transmit power value, determining the alarm condition exists;
    (f) determining the delta transmit power for a plurality of neighboring subscriber units; and
    (g) when the delta transmit power for more than a predetermined number of the plurality of neighboring subscriber units exceeds the predetermined delta transmit power value, canceling the alarm condition.

* * * * *